United States Patent
Töpfer (10) Patent No.: US 9,687,944 B2
(45) Date of Patent: Jun. 27, 2017

(54) TAG FEEDER

(71) Applicant: Poly-clip System GmbH & Co. KG, Hattersheim (DE)

(72) Inventor: Klaus Töpfer, Büttelborn (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 414 days.

(21) Appl. No.: 13/725,347

(22) Filed: Dec. 21, 2012

(65) Prior Publication Data

US 2013/0160280 A1   Jun. 27, 2013

(30) Foreign Application Priority Data

Dec. 22, 2011   (EP) ..................................... 11010077

(51) Int. Cl.
| | | |
|---|---|---|
| *B23Q 5/00* | (2006.01) | |
| *B23Q 7/00* | (2006.01) | |
| *B23Q 15/00* | (2006.01) | |
| *B65B 61/00* | (2006.01) | |
| *B65B 51/04* | (2006.01) | |
| *B65B 51/00* | (2006.01) | |

(Continued)

(52) U.S. Cl.
CPC .............. *B23P 19/00* (2013.01); *B65H 35/00* (2013.01); *B65H 20/18* (2013.01); *Y10T 29/5122* (2015.01)

(58) Field of Classification Search
CPC ........ B65H 35/00; B65H 35/10; B65H 20/18; B23P 19/00; Y10T 29/5122; B65C 7/00
USPC ............. 24/16 PB, 16 R, 17 A; 53/415, 417, 53/135.1, 136.1, 136.5, 138.1–138.4; 29/559, 561
See application file for complete search history.

(56) References Cited

U.S. PATENT DOCUMENTS 3,415,182 A * 12/1968 White ........................ B65C 5/06
101/288
3,469,754 A * 9/1969 Parker ............................ 226/68
(Continued)

FOREIGN PATENT DOCUMENTS

| DE | 199 01 039 C2 | 1/2001 |
|---|---|---|
| EP | 1 595 798 A2 | 11/2005 |
| WO | 9007726 A1 | 7/1990 |

OTHER PUBLICATIONS

DE 199 01 039 C2—Machine translation obtained from Espacenet (http://worldwide.espacenet.com) on May 14, 2013, 6 pages.

*Primary Examiner* — Sarang Afzali
*Assistant Examiner* — Darrell C Ford
(74) *Attorney, Agent, or Firm* — Fitch, Even, Tabin & Flannery LLP (57) ABSTRACT

Disclosed is a method and a tag feeder for feeding tags in a feeding direction to a dispensing position within a clipping machine. The tag feeder is provided with a feeding mechanism with at least one pusher means for transporting a chain of tags. The pusher means is reversible movable parallel to the feeding direction between a first and second position wherein, in the first position, the pusher means is in a minimum displacement to the dispensing position, and wherein, in the second position, the pusher means are in a maximum displacement to the dispensing position. The feeding mechanism comprises at least one cutting tool for cutting-off the foremost tag of the chain of tags, viewed in the feeding direction, in the first position and at least one clamping device for clamping the chain of tags when the foremost tag is arranged in the first position.

18 Claims, 9 Drawing Sheets

(51) Int. Cl.
    *B23P 19/00*     (2006.01)
    *B65H 35/00*     (2006.01)
    *B65D 63/00*     (2006.01)
    *B65D 67/02*     (2006.01)
    *B65H 20/18*     (2006.01)

(56) References Cited

U.S. PATENT DOCUMENTS

| | | | | |
|---|---|---|---|---|
| 3,910,811 | A * | 10/1975 | Paxton et al. | 156/521 |
| 4,083,164 | A * | 4/1978 | Hagedorn | B65B 51/05 29/243.56 |
| 4,519,178 | A | 5/1985 | Crabb, Jr. | |
| 6,115,993 | A * | 9/2000 | O'Donnell | 53/389.4 |
| 6,676,315 | B1 * | 1/2004 | Haschke | 400/617 |
| 7,596,928 | B2 * | 10/2009 | Irwin | 53/417 |
| 2004/0194430 | A1 * | 10/2004 | Draghetti et al. | 53/415 |
| 2005/0178037 | A1 * | 8/2005 | Kunreuther | 40/674 |
| 2006/0101787 | A1 * | 5/2006 | Hartmann | 53/138.3 |

* cited by examiner

TAG FEEDER

This application claims priority to, and the benefit of, European Patent Application No. 11 010 077.3 filed Dec. 22, 2011 with the European Patent Office, which is hereby incorporated by reference.

BACKGROUND OF THE INVENTION

The present invention relates to a tag feeder and a method for feeding tags being provided in a chain of tags, in a feeding direction to a dispending position within a clipping machine.

In particular, the invention concerns a tag feeder wherein a feeding mechanism is provided with at least one pusher means for transporting the chain of tags. The pusher means is reversibly movable approximately parallel to the feeding direction between a first and second position, wherein in the first position, the pusher means is in a minimum displacement to the dispensing position and wherein, in the second position, the pusher means is in a maximum displacement to the dispensing position.

Moreover, the invention concerns a method for feeding tags being provided in a chain of tags, in a feeding direction to a dispensing position within a clipping machine by means of a feeding mechanism with at least one pusher means for transporting the chain of tags.

Thereby, the pusher means is reversibly movable approximately parallel to the feeding direction between a first and second position, wherein, in the first position, the pusher means is in a minimum displacement to the dispensing position and wherein, in the second position, the pusher means is in a maximum displacement to the dispensing position.

It is usual practice in the production, for example, of sausage-shaped products or bag-shaped products containing food or non-food items, respectively, to use an automatic clipping machine. In the production of sausages, sausage-meat is filled via a filling tube into a flexible packaging material, like a tubular casing which is closed by a closure means, referred to as closing clip, at the first end of the to be filled packaging material. Two or more clips are applied to a plait-like portion by closing means of the clipping machine. Similarly, closing clips can be used for closing bag-shaped products. In most of the cases, clipping machines regular one and those with specific displacers for closing bags, with bladed displacers or trapping displacers are being used.

It is also usual practice to attach a tag to the sausage-shaped or bag-shaped product holding certain information regarding, for example, the expiration, the composition, the end use or the content of the sausage-shaped product. The tag consists thereby in general of a flexible strip, for example made of paper, and is provided in a chain of tags usually rolled onto a drum. For attaching the tag holding the information to the sausage-shaped product, one tag of the chain of tags is wedged between the clip and plait-like portion during the production step of applying the clips to the plait-like portion.

For that, the tag is being fed close to the closure means of the clipping machine by means of a tag feeder. The tag is therefore brought to a dispensing position at which one end of the tag is sticking out of the tag feeder and is positioned in a longitudinal arrangement close and approximately parallel to the plait-like portion. When two clips are being applied to the plait-like portion by the closing means, the tag is also enclosed by at least one clip and thereby connected to the finished sausage-shaped or bag-shaped product. Such a practice for feeding tags to a clipping machine is disclosed, for example, by DE patent 199 01 039 C2.

It is known in the practice that the procedure of providing a tag to the sausage-shaped or bag-shaped product by ripping-off the foremost tag from the chain of tags by the closure means is often not completely unproblematic and frequently causes difficulties in the production of these products. One of the main problems constitutes in the faulty separation of a single tag from the chain of tags, since often the tag does not separate at the correct position when being ripped-off. It is not unusual that just half a tag or even one and a half tags being ripped-off the chain and fed to the clipping machine. Consequently, these incorrect tags lead to interruptions in the production of sausage- or bag-shaped products by causing scrap.

In order to enhance the correct separation of one single tag from the chain, a perforation is provided between each tag as a predetermined breaking point, in order to enhance the separation of just one single tag.

However, these perforations bear also a number of difficulties for the usage in sausage-production and for the production of the actual chain of tags. The perforation need to balance certain technical requirements set to it. The perforation need to fulfill the requirement of being relative robust, in order to keep the tags attached to each other during transport and handling and at the same time the perforation has to allow the tag to separate from the chain of tags with relatively little force applied to it. Complying with these requirements, in order to create a chain of tags with a suitable perforation is therefore a relative complex and expensive procedure.

Also, there are often problems with the quality of the perforation on the chain of tags. In particular, the stamping of the perforation is not always according to specification and leads to variations in size as well as position. As a result to that faulty perforation, the tags do not separate at the perforation, but separate somewhere else leaving broken tags as waste. This is mostly caused by wear of the perforation machine in general or especially by the perforation-punch.

Beyond that, the production costs for producing a chain of tags having perforations are higher than for a chain of tags without perforations, which, as a result, leads to higher overall costs in the sausage-production.

BRIEF SUMMARY OF THE INVENTION

The object of the present invention is to solve the above described problems. In particular, it is one of the objects of the present invention to provide a tag feeder a method as well as a chain of tags for the usage in the inventive tag feeder for feeding tags provided in a chain of tags in a feeding direction to a dispensing position within a clipping machine, whereby the feeding procedure of a chain of tags to the closure means of a clipping machine is improved and the entire production of sausage-shaped or bag-shaped products is made more efficient.

In order to solve the afore-said object as a tag feeder, is proposed, in particular, a tag feeder wherein a feeding mechanism is provided with at least one pusher means for transporting the chain of tags. The pusher means is reversibly movable at least approximately parallel to the feeding direction between a first and second position, wherein, in the first position, the pusher means is in a minimum displacement to the dispensing position and wherein, in the second position, the pusher means is in a maximum displacement to the dispensing position. The tag feeder also contains a drive mechanism which is in particular acting upon and thereby driving the feeding mechanism. The drive mechanism can be in form of a separate electric motor, a hydraulic or pneumatic piston-cylinder unit or any other suitable drive mechanism. Alternatively, the drive mechanism can be part of the clipping machine, so that the tag feeder and in particularly the feeding mechanism is essentially driven by the clipping machine itself.

According to the present invention, it is proposed that the feeding mechanism comprises at least one cutting tool for cutting-off the foremost tag of the chain of tags, viewed in the feeding direction, in the first position and at least one clamping device for clamping the chain of tags when the foremost tag is arranged in the first position. By clamping the chain of tags and cutting-off the foremost tag of the chain of tags, it is assured that the separation procedure for separating a single tag from the chain of tags is improved and the entire production is made more efficient. In particular, it is preferred to use a chain of tag without perforation or piercings between each tag as predetermined breaking points.

It is advantageous that the pusher means comprises at least one tine, preferably two tines being positioned at a front end of the pusher means facing in the feeding direction, in order to facilitate the coupling with the foremost tag for the movement of the chain of tags and also to create space for the cutting tool. The tine is thereby ensuring a secure feeding of the tags within the tag feeder. In another advantageous embodiment of the invention, the tags are being fed by means of a gear pinion able to couple with or behind the tag. It is also possible that the feeding of the tags are being done by a mechanism which comprises at least one finger or hook and which is able to grab behind the tag, in order to transport the tag forward.

In an advantageous arrangement of the present invention, the cutting tool comprises a cutting edge being positioned next to at least one tine. By doing so, the same forward-motion which is moving the pusher means towards the dispensing position is used for operating the cutting tool. In an alternative embodiment of the invention, the cutting tool can be in form of a separate knife or blade able to be driven between the tags for cutting a tag off.

Also, according to another beneficial embodiment of the present invention, the clamping device comprises a roll being pivotable around a rotary axis which is arranged at least approximately horizontal and perpendicular to the feeding direction, as well as reversible linearly movable up and down along a clamping direction between a first position in which the roll is detaining the motion of the chain of tags, and a second position in which the roll is releasing the chain of tags. As a result, the clamping device is on the one hand able to detain the forward-motion of the chain of tags and on the other hand the feeding mechanism in particular with the cutting tool is movable relative to the chain of tags so that a shear force is applied between the cutting tool and the chain of tags.

Beyond that, it is also advantageous, that the clamping device is accommodated in a casing and connected to the pusher means. By doing so, the forward-motion of the clamping device is transmitted to the pusher means.

In an alternative embodiment, the casing accommodating the clamping device together with the roll is reversible linearly movable up and down along the clamping direction or vertically to the feeding direction, respectively. By doing so, the casing is movable between a first position in which the roll is detaining the motion of the chain of tags, and a second position in which the roll is releasing the chain of tags.

In order to apply data and information permanently onto the tags, an imprinting device is provided for imprinting the tags comprising at least one imprinting block and at least one imprinting press. The imprinting device can be formed by a printer for printing the tags comprising at least one printing die or block, respectively, and at least one printing press. Also, the imprinting device can be formed by a coining device for coining the tags comprising at least one coining die and at least one coining press.

For providing guiding means for the pusher means and the clamping device, it is also beneficial that a housing is provided which comprises a channel including a channel bottom and an opening being located at the uppermost side of the housing and extending at least approximately along the complete length of the housing parallel to the feeding direction.

It is advantageous that the channel comprises a first and second section, whereby the first section comprises at least one longitudinal cut-out, preferably two cut-outs, extending at least approximately parallel to the feeding direction thereby leaving a longitudinal elevation positioned on the channel bottom extending at least approximately along the center axis of the first section of the channel and at least approximately parallel to the feeding direction. In that way, a platform with a level difference to the channel bottom is created for supporting the chain of tags. Moreover, the pusher means is guided safely.

Furthermore, for providing an optimal coupling between the pusher means and the tag, it is also beneficial, that at least one tine of the pusher means is running in at least one cut-out and the foremost tag of the chain of tags is positioned on the elevation to be lifted-off the channel bottom, so that the at least one tine of the pusher means is enabled to move at least partially underneath the foremost tag of the chain of tags.

Beyond that, it is also advantageous, that the housing comprises a cover having a first section with a first longitudinally extending opening which is positioned on top of the first section of the channel for accommodating and supporting the guidance of the pusher means as well as a second section with a second longitudinally extending opening which is positioned on top the second section of the channel for accommodating and guiding the clamping device. In that way, the pusher means as well as the clamping device are kept in a controlled linear motion within or above the housing, respectively.

According to another beneficial embodiment, it is also advantageous that the first section of the channel comprises guiding means for guiding at least the foremost tag of the chain of tags along the first section of the channel. Thus, the tag is kept in the intended position within the channel when being moved along the first section of the channel towards the dispending position. Thereby, the guiding means are formed by the first section of the channel and the first section of the cover.

The object of the present invention as to the method is solved by the features described herein. In particular, a method is provided for feeding tags being provided in a chain of tags, in a feeding direction to a dispending position within a clipping machine by means of a feeding mechanism with at least one pusher means for transporting the chain of tags. The pusher means is thereby reversibly movable at least approximately parallel to the feeding direction between a first and second position, wherein, in the first position, the pusher means is in a minimum displacement to the dispensing position, and wherein, in the second position, the pusher means is in a maximum displacement to the dispensing position.

According to the present invention, the following steps are proposed: moving the pusher means into a separating position, wherein a clamping device is clamping the chain of tags when the foremost tag, in view of the feeding direction, is arranged in the first position and a cutting tool is cutting-off the foremost tag of the chain of tags viewed in the feeding direction in the first position. By clamping the chain of tags and cutting-off the foremost tag of the chain of tags, it is assured that the separation procedure for separating a single tag from the chain of tags is improved and the entire production sausage- or bag-shaped products is made more efficient.

Beyond that, the inventive method also comprises the step of moving at least one tine, preferably two tines of the pusher means underneath the foremost tag in order to push the chain of tags in the feeding direction towards the dispensing position. By doing so, an optimal coupling is being provided between the pusher means and the tag.

For applying permanently data and information onto the tags, the inventive method also comprises the steps of imprinting at least one tag of the chain of tags when the pusher means is moving from the first position into the second position. The imprint can be arrived on a tag being provided in several positions behind the foremost tag, viewed in the feeding direction of the chain of tags. Thus, feeding of the tags or the chain of tags, respectively, and/or cutting the foremost tag and/or dispensing of the foremost tag and/or imprinting of one tag can be carried out at least approximately simultaneously.

The inventive tag feeder and the inventive method for feeding tags allow the use of any kind of chain of tags. In particular, chain of tags can be used wherein a separating aid, e.g. a perforation, is provided between such tag. However, the inventive tag feeder and the inventive method for feeding tags is in particular useful if there is not provided any separation aid between each tag. In other words, a chain of tags can be used for the inventive tag feeder or the inventive method for feeding tags both described above wherein the tags of the chain of tags are directly linked with each other by material connection, i.e. without any separation and like, e.g. a perforation.

Beyond that, it is also the further object of the present invention to provide a chain of tags for the usage in the inventive tag feeder wherein the tags aligned with the first end of the neck strap in the feeding direction, are separable from the chain of tags independent from the orientation of the chain of tags to the feeding direction. As the separation of the tags from the chain of tags is performed by cutting-off the tags with the cutting tool of the inventive tag feeder, the chain of tags does not need to comprise perforations as predetermined breaking points between each tag, in order to enhance the separation of just one single tag. The perforations between the tags need to be considered when loading the chain of tags into a tag feeder, so that the correct ends, i.e. the neck strap of the tag, are being fed to the clipping machine. Without such a perforation, the chain of tags can be loaded in either direction, i.e. forwards or backwards, into a tag feeder.

Other advantages and one embodiment of the present invention shall now be described with reference to the attached drawings. The terms "top", "bottom", "left" and "right" used when describing the embodiment, relate to the drawings orientated in such a way that the reference numerals and name of the figures can be read normally.

DETAILED DESCRIPTION OF THE INVENTION

The inventive tag feeder TF described in the following is used in the production of sausage-shaped products or the like. It may also be used, of course, in the production of sausage-shaped products which do not include foodstuffs, but for example, sealing compounds or adhesives. Moreover, it can be used in the production of bag-shaped products or the like including food or non-food items, respectively.

The tag feeder TF and in particular a feeding mechanism 10, which is included therein and which will be described later in more detail, is running through feeding circles. A feeding circle consists basically of four different settings, i.e. a loading setting, an imprinting setting, a transport setting and a cutting-off setting. All these settings will be described in more detail later. The imprinting setting, the transport setting and the cutting-off setting are especially required in the production of sausage- or bag-shaped products, in order to provide tags T holding information regarding the sausage- or bag-shaped products which are to be attached to the actual product.

Figure 6:
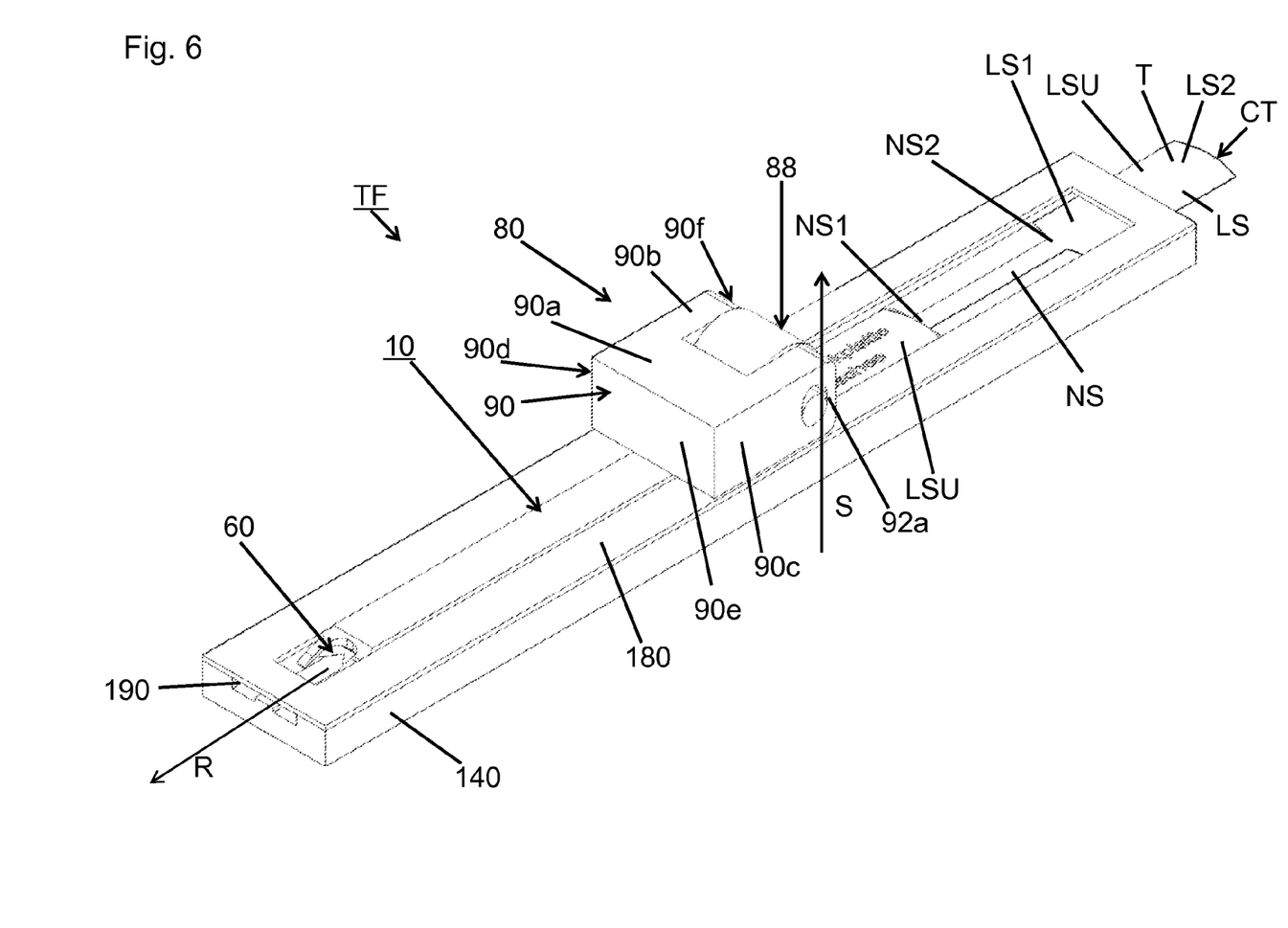
FIG. 6 shows a perspective view of the inventive tag feeder in a position, in which the imprinting of a tag starts.

As it can be seen in particular in FIG. 6, a single tag T of a chain of tags CT comprises an approximately rectangular label section LS having a first end LS1 and a second end LS2 as well as a neck strap NS with a first end NS1 and a second end NS2. Label section LS also comprises an upper side LSU and a lower side (not shown). Upper side LSU is serving as an imprinting surface onto which information are attached to. The attachment of the information onto label section LS is described later in more detail. The neck strap NS is smaller in width than label section LS and second end NS2 of neck strap NS is connected to first end LS1 of label section LS thus creating two shoulder sections at the label section LS. Tag T is basically made of a flexible strip plastic, paper or any other suitable material. Tags T attached to each other create the chain of tags CT which can be rolled up on a drum (not show). The chain of tags CT is arranged within tag feeder TF, so that first end NS1 of neck strap NS is facing a feeding direction R.

In the production of sausage- or bag-shaped products, a preferably automatic clipping machine is used. Independently from the fact whether a sausage-shaped product or bag-shaped product is to be produced, a plait-like portion is formed by the clipping machine (one in case of a bag-shaped product, two in case of a sausage-shaped product). One or more closing clips, or clips for short, can then be applied to that plait-like portion by a closing means.

Tag T imprinted with information regarding, for example, the expiration, the composition, the end use or the content of the sausage- or bag-shaped product, are attached to the product by wedging one tag T at a time between the clip and plait-like portion during the production step of applying the clips to the plait-like portion. For that, neck strap NS of tag T is being fed close to the closure means of the clipping machine by means of tag feeder TF. First end NS1 of neck strap NS is thereby facing in feeding direction R. Tag T is therefore transported along tag feeder TF in feeding direction R to a dispensing position at which tag T is sticking out of tag feeder TF and is positioned in a longitudinal arrangement close and approximately parallel to the plait-like portion. When the closing clip is being applied to the plait-like portion by the closing means, tag T is also enclosed by the clip and thereby connected to the finished sausage- or bag-shaped product.

Figure 1:
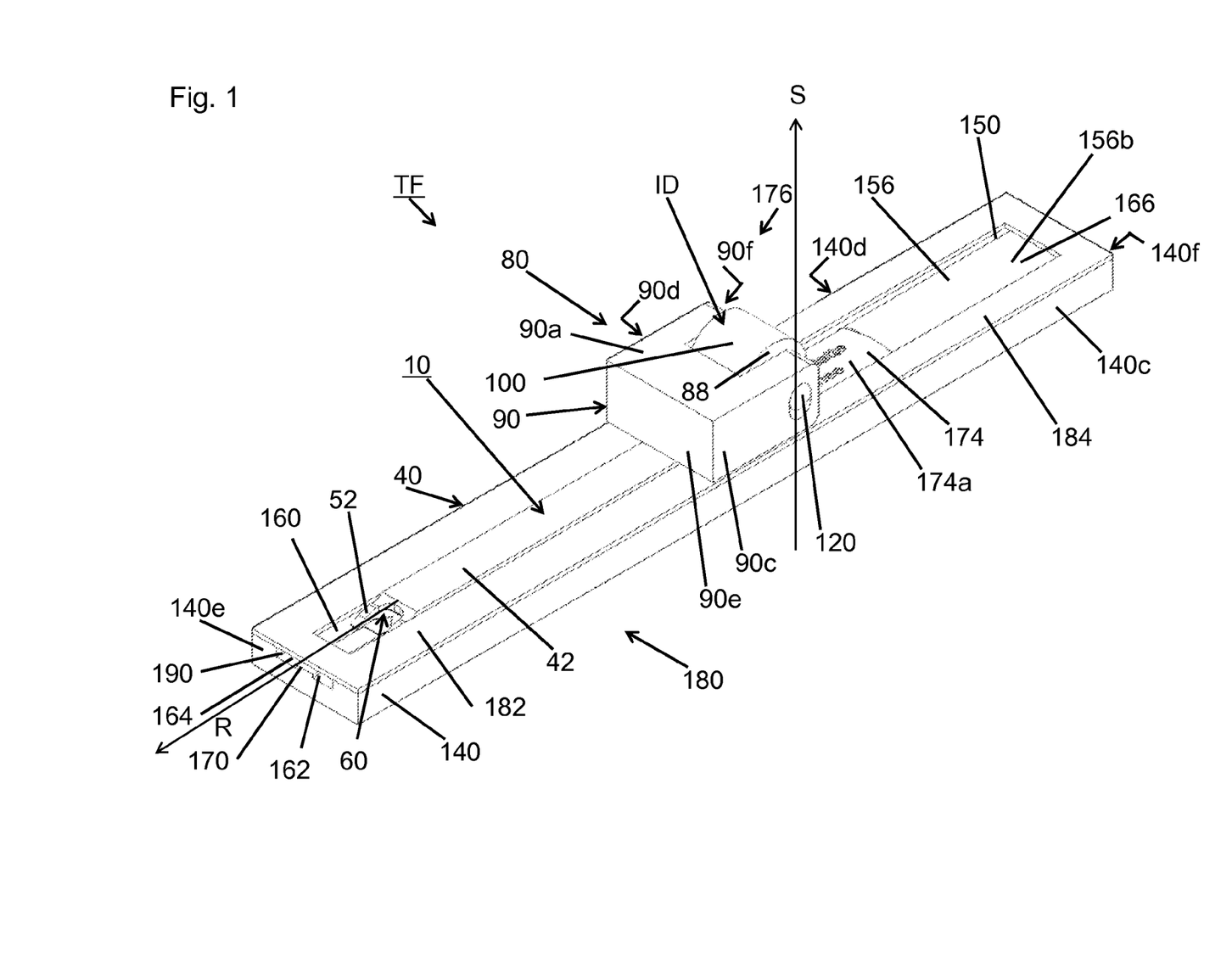
FIG. 1 shows a perspective view of an inventive tag feeder.

FIG. 1 shows a schematic perspective view of inventive tag feeder TF with feeding mechanism 10 according to a preferred embodiment.

Inventive tag feeder TF comprises basically a feeding mechanism 10 and a housing 140. Feeding mechanism 10 comprises a pusher means 40, a cutting tool 60 and a clamping device 80.

Figure 2:
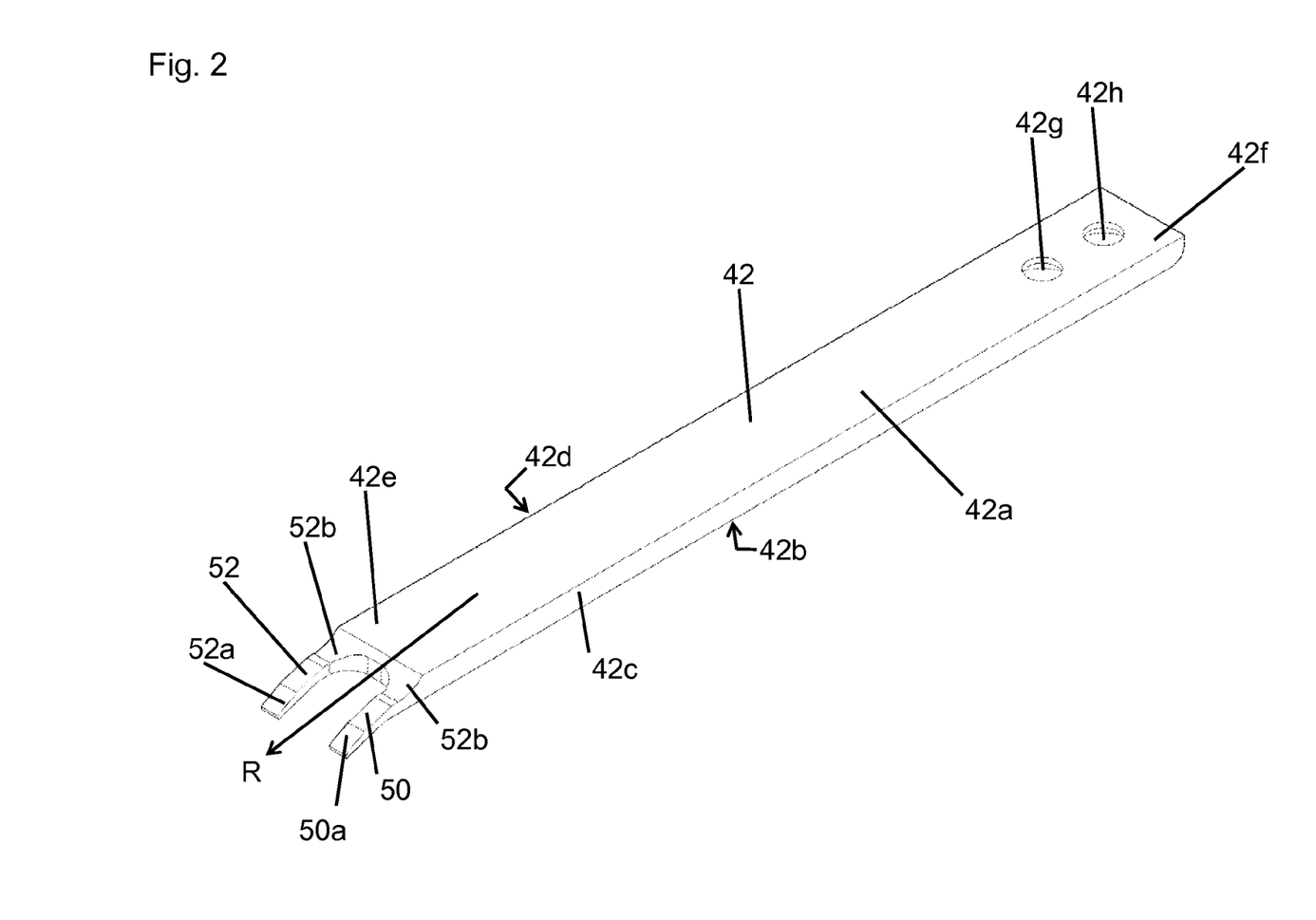
FIG. 2 shows a perspective view of a pusher means of the inventive tag feeder.

As shown in FIG. 2, pusher means 40 comprises a longitudinal pusher means-plate 42 having an upper side 42a, lower side 42b, a left side 42c (viewed in the feeding direction R), a right side 42d, a front end 42e facing in feeding direction R and a rear end 42f. Pusher means-plate 42 also comprises two holes 42g, 42h positioned one after the other in a line approximately parallel to feeding direction R near the rear end 42f. Pusher means 40 can be made out of metal, ceramic, plastic or any other suitable material.

As also shown in FIG. 2, pusher means 40 also comprises a first tine 50 and a second tine 52. Each tine 50, 52 is having a first end 50a, 52a and a second end 50b, 52b. Each tine 50, 52 comprises an inclination, so that they are bent downwards in a direction approximately perpendicular to feeding direction R. Second ends 50b, 52b of each tine 50, 52 are connected to front end 42e of pusher means-plate 42. Tines 50, 52 are thereby creating a clearance between them. Pusher means-plate 42 and tines 50, 52 are positioned within tag feeder TF approximately parallel to feeding direction R. Tines 50, 52 can be made out of metal, ceramic, plastic or any other suitable material.

Figure 3:
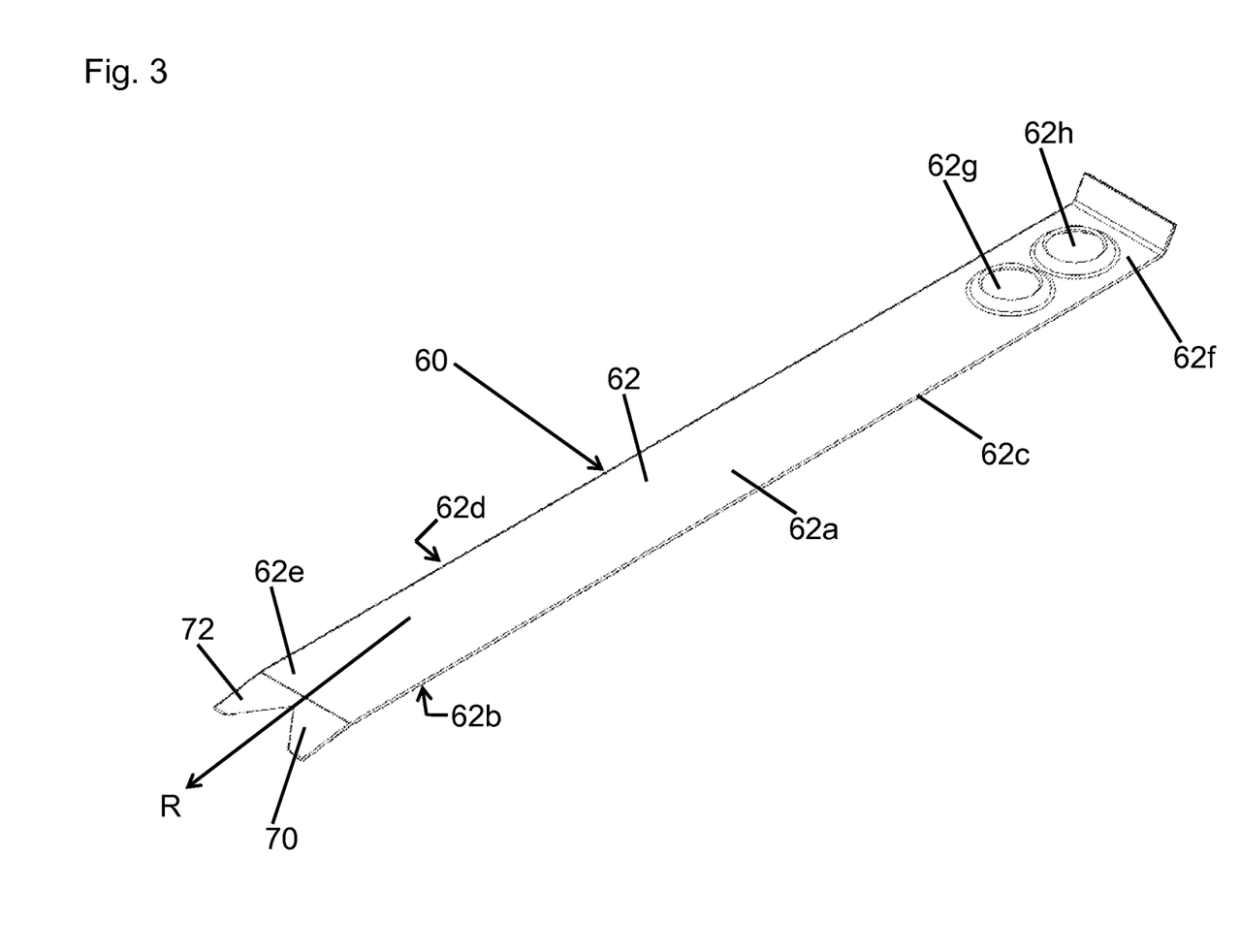
FIG. 3 shows a perspective view of a cutting tool of the inventive tag feeder.

Furthermore, as shown in FIG. 3, tag feeder TF also comprises cutting tool 60 having a longitudinal cutting tool-plate 62 with an upper side 62a, a lower side 62b, a left side 62c (viewed in the feeding direction R), a right side 62d, a front end 62e facing in feeding direction R and a rear end 62f. Cutting tool-plate 62 also comprises two holes 62g, 62h positioned one after the other in a line approximately parallel to feeding direction R near rear end 62f. Cutting tool 60 can be made out of metal, ceramic, plastic or any other suitable material.

Cutting tool 60 also comprises a first cutting edge 70 and a second cutting edge 72 being positioned at front end 62e of cutting tool-plate 62. Two cutting edges 70, 72 are positioned at an angle towards each other, so that a V-shaped notch is created between them.

Cutting tool-plate 62 of cutting tool 60 is positioned underneath pusher means-plate 42 of pusher means 40 in such an arrangement that upper side 62a of cutting tool-plate 62 is in contact with lower side 42b of pusher means-plate 42. As a result, first cutting edge 70 is positioned approximately underneath first tine 50 and second cutting edge 72 is positioned approximately underneath second tine 52. Also, the V-shaped notch is thereby arranged between the two tines 50, 52 in the clearance. Thereby, holes 42g, 42h of the pusher means-plate 42 and holes 62g, 62h of the cutting tool 62 are aligned with each other.

Figure 7:
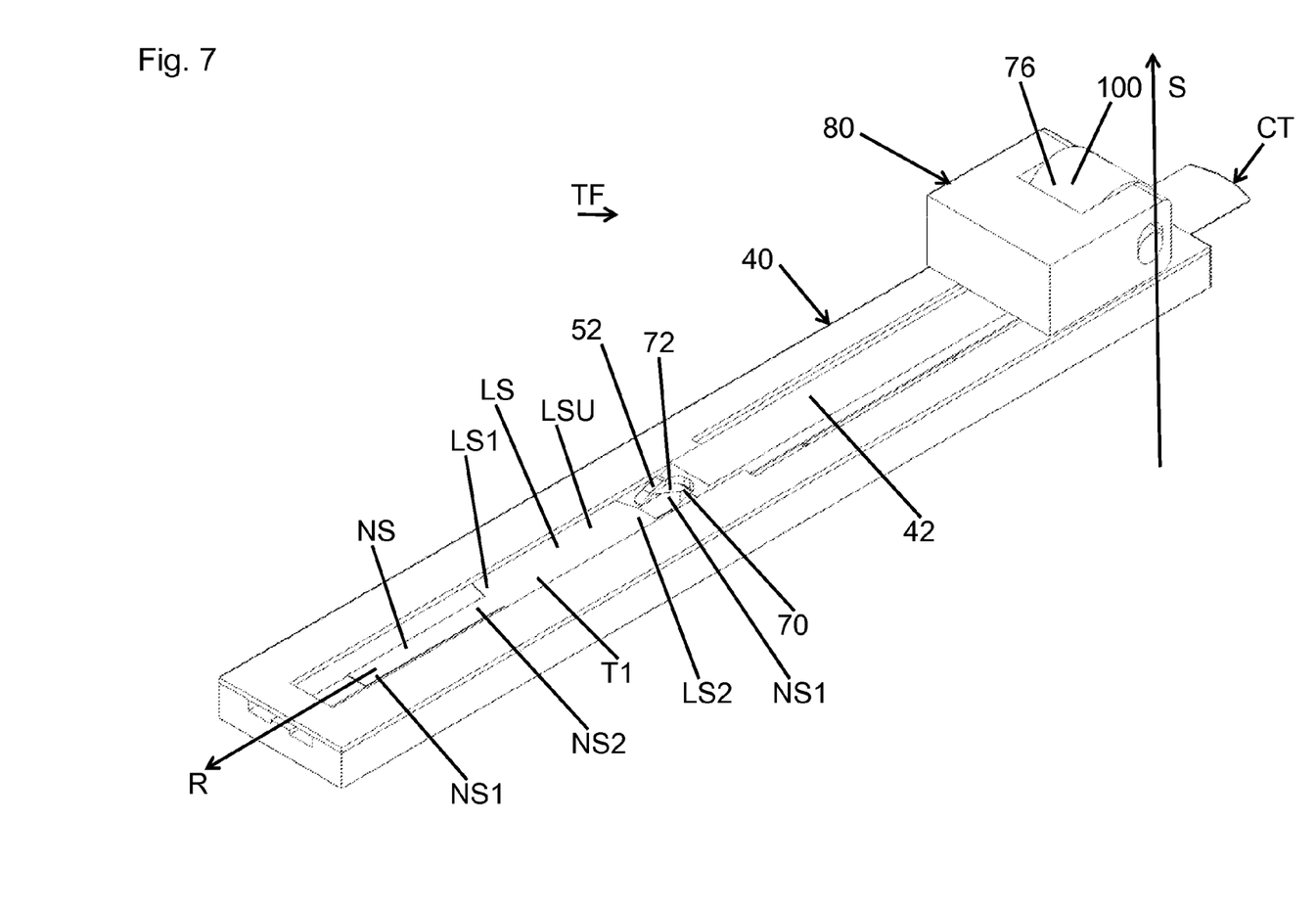
FIG. 7 shows a perspective view of the inventive tag feeder in a position in which the imprinting of a tag ends.

Beyond that, clamping device 80 comprises a casing 90, a roll 100 and a horizontal rotation axis 120 (see FIGS. 1 and 7).

As shown in FIG. 6, casing 90 is in form of a rectangular or cuboid-shaped block comprising an upper side 90a, lower side (not shown), a left side 90c (viewed in feeding direction R), a right side 90d, a front end 90e and a rear end 90f. Casing 90 can be made out of metal, ceramic, plastic or any other suitable material. Casing 90 is arranged within feeding mechanism 10 such that its front end 90e is facing in feeding direction R. The height of the block is thereby smaller than the length or the width of the block. Rear end 90f of casing 90 comprises a cut-out 88 leaving a first bar 92a and a second bar 92b being arranged approximately parallel to each other in feeding direction R. Bars 92a, 92b are pointing in a direction opposite to feeding direction R. First bar 92a comprises a first longitudinal hole 94a and second bar 92b comprises a second longitudinal hole (not shown). The first longitudinal hole 94a and the second longitudinal hole (not shown) are in a vertical arrangement and thereby perpendicular to feeding direction R.

Casing 90 also comprises two borings (not shown) positioned at its lower side (not shown) one after the other in a line at least approximately parallel to feeding direction R. Pusher means-plate 42 of pusher means 40 as well as cutting tool-plate 62 of cutting tool 60 is linked with casing 90 by means of two bolts (not shown). As described before, cutting tool-plate 62 is positioned under pusher means-plate 42 so that upper side 62a of cutting tool-plate 62 is in contact with lower side 42b of pusher means-plate 42 with respective holes 42g, 42h, 62g, 62h on top of each other, so that the bolts (not shown) extend through the holes 42g, 42h, 62g, 62h and into the borings (not shown) of the block.

Roll 100 is in form of a cylinder and comprises a centre hole (not shown) extending through the height of the cylinder. Roll 100 is made out of a flexible material such as rubber or any other suitable material. The diameter of role 100 is thereby larger than the height of the block of casing 90.

Roll 100 is arranged in such that its horizontal rotation axis 120 is perpendicular to feeding direction R.

Roll 100 is positioned between two bars 92a, 92b and within cut-out 88 of casing 90, so that horizontal rotation axis 120 is extending through the centre hole (not shown) of roll 100 and first longitudinal hole 94a and second longitudinal hole (not shown). Thereby, the curved surface of roll 100 emerges from upper side 90a and lower side (not shown) of casing 90. First longitudinal hole 94a and second longitudinal hole not shown) allow horizontal rotation axis 120 and consequently roll 100 to be reversible linearly movable between an up-position and a down-position in a damping direction S at least approximately perpendicular to feeding direction R perpendicular to the plane of upper side 42a of pusher-plate 42. In the up-position, roll 100 and horizontal rotation axis 120 are in the uppermost arrangement within casing 90, whereas in the down-position roll 100 and rotation axis 120 are in the lowermost arrangement within casing 90. Rotation axis 120 can be made out of metal, ceramic, plastic or any other suitable material.

Figure 4:
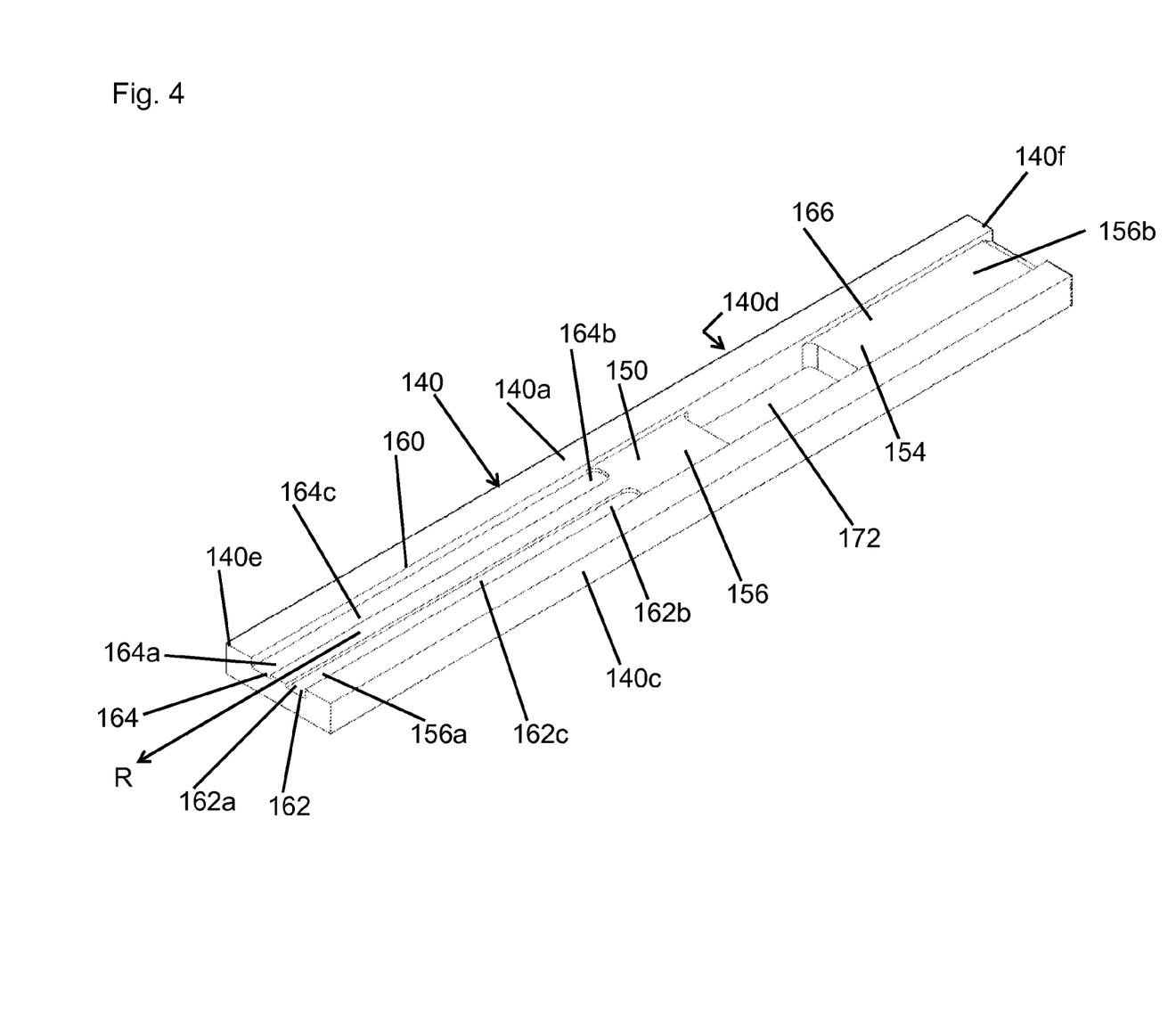
FIG. 4 shows a perspective view of a housing of the inventive tag feeder.

Tag feeder TF also comprises a housing 140 in form of a longitudinal block having an upper side (not shown), lower side (not shown), a left side 140c (viewed in feeding direction R), a right side 140d, a front end 140e and a rear end 140f (see FIG. 4). Housing 140 is in such an arrangement that the front end 140e is facing in feeding direction R. Housing 140 can be made out of metal, ceramic, plastic or any other suitable material. Housing 140 also comprises a channel 150 including a channel bottom 154 and a channel 156. Channel opening 156 having a front end 156a and a rear end 156b is located at the upper side (not shown) of housing 140 and extends along the complete length of housing 140 parallel to feeding direction R. Channel 150 as well as channel opening 156 is at least as wide as the height of label section LS of tags T, so that the chain of tags CT can be positioned within opening 156.

Beyond that and as also shown in FIG. 4, channel 150 comprises a first section 160 and a second section 166, whereby first section 160 contains a first longitudinal cut-out 162 and a second longitudinal cut-out 164. Each longitudinal cut-out 162, 164 comprises respectively a first end 162a, 164a, a second end 162b, 164b, a cut-out bottom 162c, 164c extending parallel to feeding direction R. Between the two cut-outs 162, 164 a longitudinal elevation 170 is created which is positioned on channel bottom 154 and which extends at least approximately along the center axis of first section 160 of channel 150 and at least approximately parallel to feeding direction R.

As shown in FIG. 4, second section 166 of channel 150 comprises a cut-out 172 at channel bottom 154 in which an imprinting block or imprinting die 174 is positioned. Imprinting block 174 is releasably fixed to second section 166 of channel 150 by fixing means which are not shown here. The fixing means can be in form of bolts or a separate clamping device. Imprinting block 174 can be removed from tag feeder TF and replaced by a different imprinting block for imprinting different information. Imprinting block 174 functions as an embossed stamp comprising elevated characters or symbols at its upper side 174a. Imprinting block 174 can be made out of metal, ceramic, plastic or any other suitable material. Imprinting block 174 is in such an arrangement when positioned in cut-out 172 of channel bottom 154 that the upper side 174a of imprinting block 174 is approximately on level with channel bottom 154. Imprinting block 174 forms the counter part to roll 100 which is also functioning as an imprinting press 176. Imprinting block 174 and imprinting press 176 constitute an imprinting device ID for imprinting tags T and in particular label section LS of tags T. Imprinting device ID can also be in form of a coining device wherein imprinting press 176 is formed as a coining press and imprinting block 174 is formed as a coining die. Also, imprinting device ID can be in form of a printing device where imprinting press 176 is formed as a printing press and imprinting block 174 is formed as a printing die.

Figure 5:
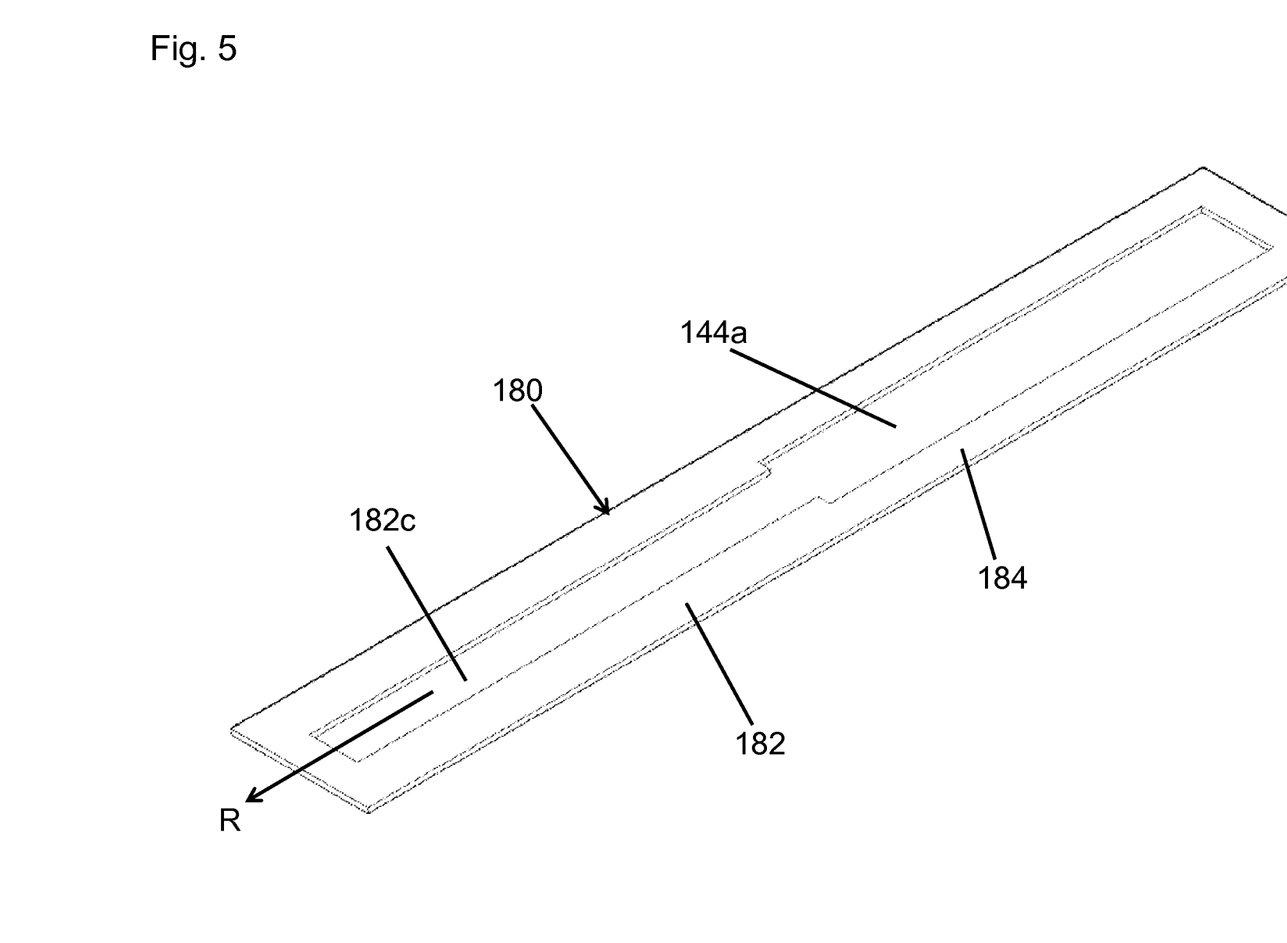
FIG. 5 shows a perspective view of a cover of the inventive tag feeder.

Moreover, housing 140 comprises a longitudinal cover 180 having a first section 182 and a second section 184, as shown in FIG. 5. First section 182 contains a first longitudinally extending opening or cut-out hole 182a which is positioned on top of first section 160 of channel 150. Second section 184 contains a second longitudinally extending opening or cut-out hole 184a which is positioned on top of second section 166 of channel 150. A small gap 190 is provided between channel bottom 154 and first section 182 of cover 180. First opening 182a of first section 182 is smaller in width than the second longitudinal hole 184a of second section 184. Beyond that, first opening 182a of first section 182 of cover 180 is at least as wide as the pusher means-plate 42 of pusher means 40 whereas second opening 184a of second section 184 is at least as wide as the height of roll 100 in its horizontal arrangement.

As shown in FIG. 1, feeding mechanism 10 is positioned on top of housing 140 in such an arrangement that front end 42e of pusher means 40 as well as the front end 90e of casing 90 is facing in feeding direction R. Pusher means 40 is accommodated within first section 160 of channel 150 as well as within first opening 182a of first section 182 of cover 180. Pusher means-plate 42 of pusher means 40 is thereby pointing half way through first opening 182a of first section of cover 180. First ends 50a, 52a of each tine 50, 52 are positioned inside cut-outs 162, 164 of first section 160 of channel 150, so that first ends 50a, 52a of tines 50, 52 are just not in contact with cut-out bottoms 162c, 164c, in order to leave a clearance between them.

In contrast to that, roll 100 is accommodated within the second opening 184a of second section 184 of cover 180.

Pusher means 40 is thereby reversibly linear movable along first section 160 of channel 150 along feeding direction R. Similarly, clamping device 80 is reversibly linear movable along second section 166 of channel 150 also along feeding direction R.

Figure 8:
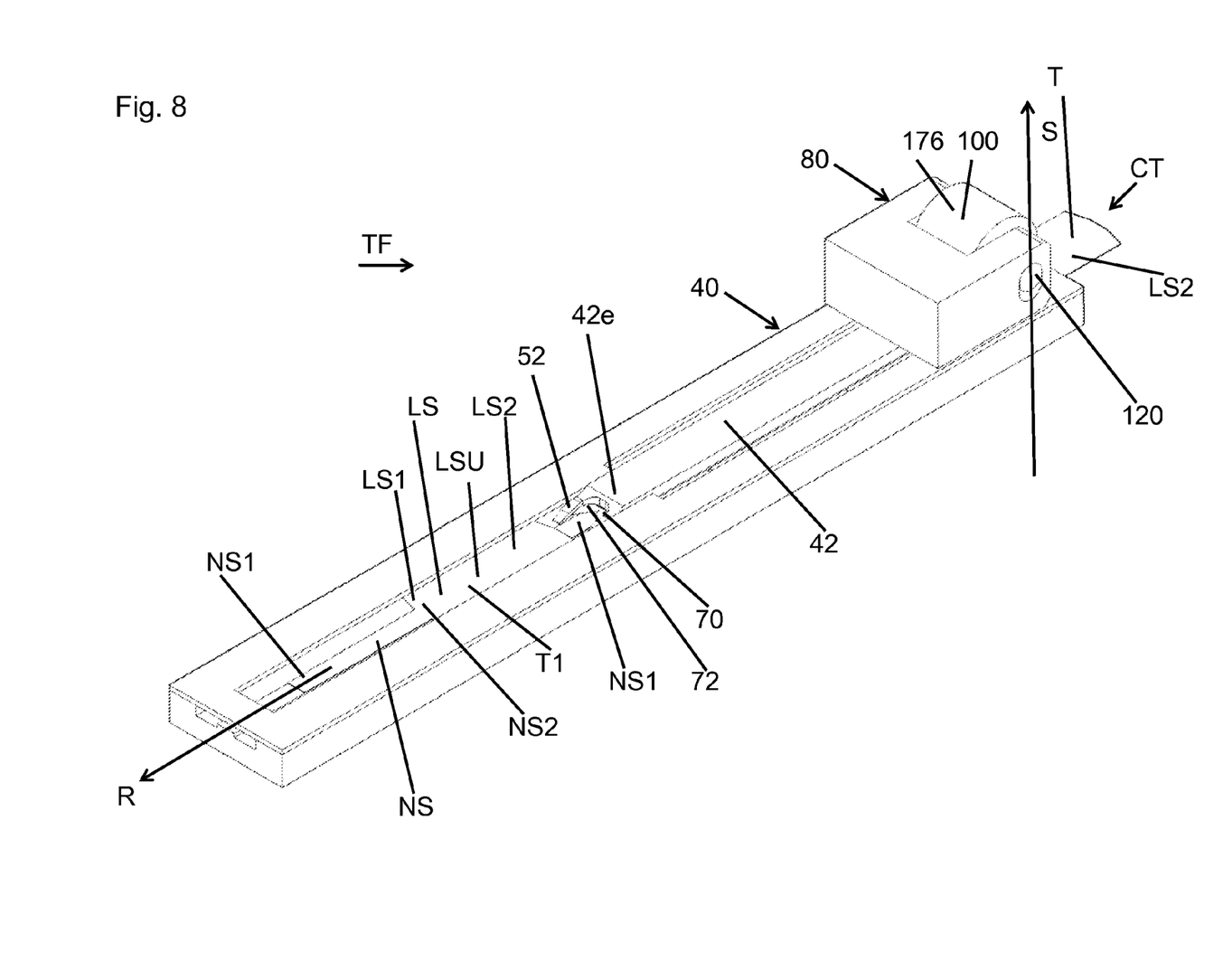
FIG. 8 shows a perspective view of the inventive tag feeder in a loading position for, among others, loading a chain of tags into the tag feeder or in the starting position of the feeding process, respectively.

The principle of operation will be described in the following:

FIG. 8 shows tag feeder TF in a first position defining one of the possible loading settings. In this loading setting, feeding mechanism 10 is positioned at rear end 156b of channel opening 156 with the roll 100 of the clamping device 80 in the up-position, so that a clearance is created between roll 100 and channel bottom 154. As a result, chain of tags CT is loaded into tag feeder TF by fitting the chain of tags CT between feeding mechanism 10 and housing 140. Chain of tags CT is loaded in such a way into tag feeder TF that second end LS2 of foremost tag T1 is placed just in front of tines 50, 52 so that, as described before, tines 50, 52 are able to couple with the shoulder sections of label section LS.

FIG. 1 shows tag feeder TF also in a first position defining another of the possible loading settings.

It shall be understood that tag feeder TF can be brought at any time during usage and at any possible position into a loading setting for chain of tags CT to be loaded into tag feeder TF, as long as roll 100 is in its up-position, so that a clearance is created between roll 100 and channel bottom 154 for the chain of tags CT to be loaded.

In the loading setting shown in FIG. 1, feeding mechanism 10 is in a minimum displacement to the dispensing position with front end 42e of pusher means 40 close to the front end 140e of housing 140. Roll 100 of clamping device 80 is positioned in front of the front end (not shown) of imprinting block 174. Also, roll 100 is in the up-position, so that a clearance is created between roll 100 and channel bottom 154. As a result, chain of tags CT is fitted between feeding mechanism 10 and housing 140, in order to place foremost tag T1 of chain of tags CT underneath pusher means 40, so that label section LS of second tag T of the chain of tags CT is positioned above imprinting block 174. Chain of tags CT is fitted into tag feeder TF in such an arrangement so that neck strap NS of tags T are pointing in feeding direction R.

FIG. 6 shows tag feeder TF with feeding mechanism 10 in a position in which the imprinting setting starts. Roll 100 is in the down-position, in which the curved surface of roll 100 is pressing onto channel bottom 154.

During the imprinting setting, feeding mechanism 10 is moving towards the rear end 140f of housing 140 with roll 100 being guided by second section 166 of channel 150. At the same time, roll 100 is pressing down onto upper side LSU of label section LS of second tag T. Roll 100 is thereby rotating around rotation axis 120 and rolling with its curved surface over label section LS of tag T lying over imprinting block 174. By doing so, information is imprinted onto upper side LSU of label section LS of that tag T. While feeding mechanism 10 is moving towards rear end 140f of housing 140, roll 100 continues to press downwards onto upper side LSU of label section LS of second tag T. When second end LS2 of label section LS of that tag T has been reached, as shown in FIG. 7, roll 100 is still pressing down onto channel bottom 154. FIG. 7 shows thereby tag feeder TF with feeding mechanism 10 in a position, which defines the end of the imprinting setting. In that position feeding mechanism 10 has reached second end 164b of second cut-out 164 and the imprinting process is finished.

In an alternative embodiment of the present invention, roll 100 is moving upwards from the down-position into the up-position when second end LS2 of label section LS of that tag T has been reached. In that alternative embodiment roll 100 is already in the up-position when feeding mechanism 10 is reaching the rear end 152 of channel 150, as shown in FIG. 8.

As already mentioned above, FIG. 8 shows the position of tag feeder TF, at which feeding mechanism 10 is at the start of the transport setting. Roll 100 is in the up-position, so that the curved surface of roll 100 is not pressing against channel bottom 154. First ends 50a, 52a of tines 50, 52 of pusher means 40 are positioned within cut-outs 162, 164 of first section 160 and also behind second end LS2 of label section LS of foremost tag T1. Neck strap NS of second tag T is thereby underneath and between two tines 50, 52, i.e. in said V-shaped notch. Foremost tag T1 is positioned on top of longitudinal elevation 170 of first section 160 of channel 150, so that label section LS of tag T reaches over each cut-out 162, 164 of first section 160.

For the transport setting, feeding mechanism 10 is moving forward within channel 150 in feeding direction R, for example by a piston-/cylinder unit, so that tines 50, 52 are coupling into the shoulder section created by second end LS2 of label section LS of foremost tag T1 and first end NS1 of neck strap NS of second tag T. By moving feeding mechanism 10 forward, pusher means 40 together with tines 50, 52 are also been moved forward, so that tines 50, 52 are pushing foremost tag T1 forward towards front end 140e of housing 140, thereby bringing foremost tag T1 into the dispensing position. Tag feeder TF with feeding mechanism 10 is then in the. Dispensing position which is defined as the position, in which neck strap NS and approximately half of label section LS of foremost tag T1 is extending beyond front end 140e of housing 140. Also, in the dispending position neck strap NS of foremost tag T1 reaches into the grasping area of the closure means or closing clip of the clipping machine (not shown here), so that the clip can grab onto tag T for placing it onto a sausage- or bag-shaped product.

The transport setting of feeding mechanism 10 is finished, when foremost tag T1 is being pushed shortly before reaching the dispending position. After the transport setting is finished, the cutting-off setting of feeding mechanism 10 is started.

Figure 9:
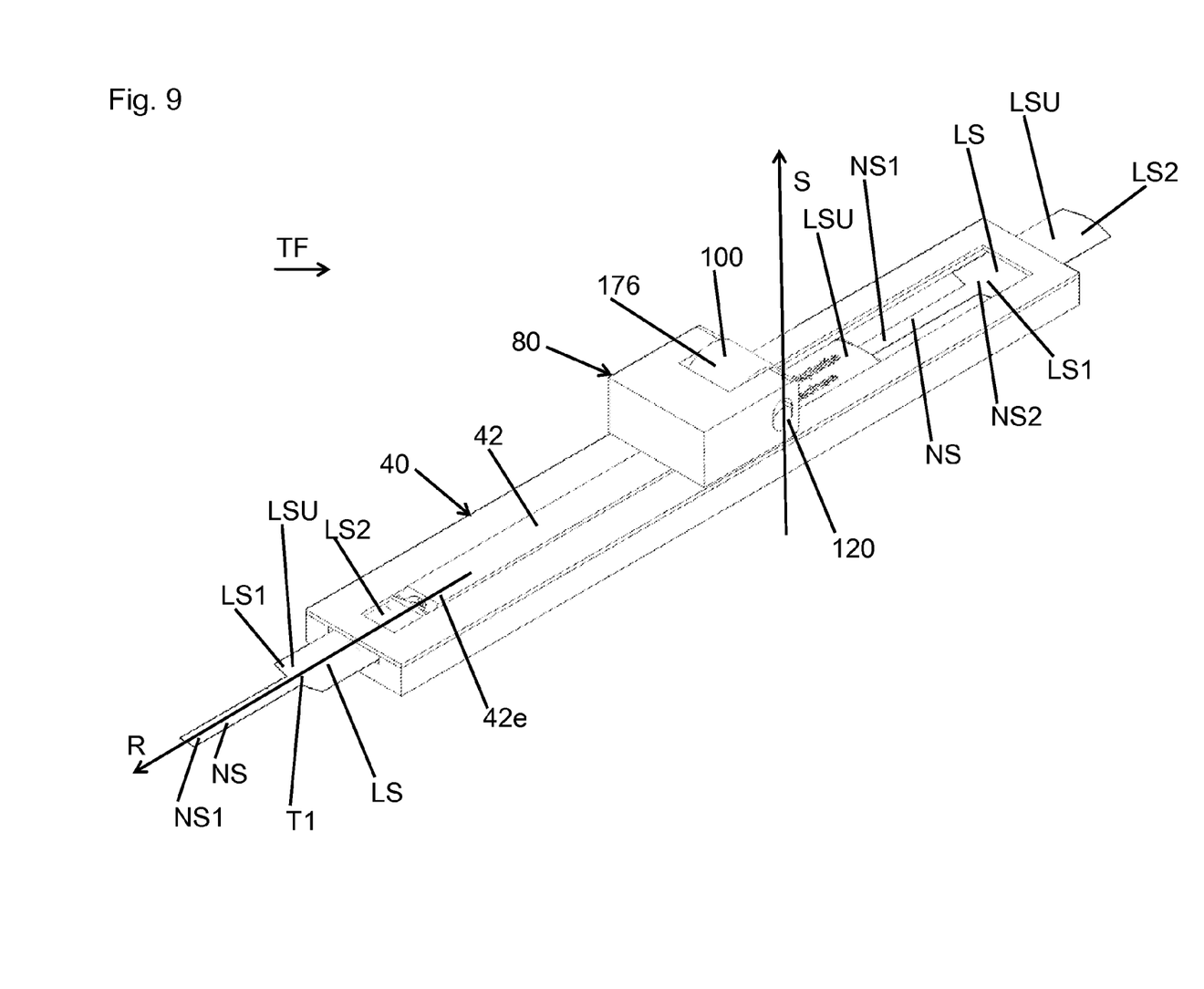
FIG. 9 shows a perspective view of the inventive tag feeder in a cutting position.

For the cutting-off setting, clamping device 80 is clamping the forward motion of the chain of tags CT relative to the forward motion of feeding mechanism 10. For doing so, roll 100 of clamping device 80 is moved from the up-position into the down-position; as shown in FIG. 9, when feeding mechanism 10 is in the position shown in FIG. 9. In that position, the curved surface of roll 100 is pressing chain of tags CT against channel bottom 154. The forward motion of chain of tags CT is thereby stopped. Since roll 100 of clamping device 80 is able to rotate around rotation axis 120 even when roll 100 is in the down-position, feeding mechanism 10 is able to move forward in feeding direction R relative to the clamped chain of tags CT.

Tag feeder TF with feeding mechanism 10 is then brought into the next position, at which chain of tags CT is clamped by roll 100 of clamping device 80 whereas feeding mechanism 10 with cutting tool 60 is moving further forward in feeding direction R. As chain of tags CT is stationary as it is being clamped by clamping device 80, the forward motion of feeding mechanism 10 with cutting tool 60 is creating a shear force between neck strap NS and the two cutting edges 70, 72 of cutting tool 60, thereby cutting through neck strap NS of second tag T for separating foremost tag T1 from chain of tags CT.

After foremost tag T1 has been separated from chain of tags CT, foremost tag T1 is being pushed a bit further forward in feeding direction R by tines 50, 52 of pusher means 40, in order to bring foremost tag T1 finally into the dispensing position, at which the clip can grab onto tag T, as described before. After foremost tag T1 has been grabbed by the clip and taken away. The cutting-off setting of feeding mechanism 10 is finished.

Also, after the cutting-off setting is finished one entire feeding circle is completed.

After the feeding circle is complete, a next feeding circle is started immediately. Since a chain of tags CT are already positioned within tag feeder TF, the loading setting as the first setting of the feeding circle is not repeated. The next feeding circle is therefore started by the imprinting setting of feeding mechanism 10, as described above.

In an alternative embodiment of the present invention, casing 90 does not comprise longitudinal holes 94a in which horizontal rotation axis 120 and roll 100 are reversible linearly movable up and down in clamping direction S. Instead, casing 90 comprises round holes (not shown) approximately at the same position as the longitudinal holes 94a. Longitudinal axis 120 which is holding roll 100 as described before is positioned within the round holes (not shown).

In this alternative embodiment of the present invention, casing 90 together with horizontal axis 120 and roll 100 is reversible linearly movable up and down in clamping direction S, in order to function appropriately for the loading setting, imprinting setting, transport setting and cutting-off setting.

The invention claimed is:

1. A tag feeder for feeding tags being provided in a chain of tags, in a feeding direction downstream to a dispensing position within a clipping machine, the tag feeder comprising:
   a feeding mechanism with at least one pusher means for transporting the chain of tags, wherein the pusher means is reversibly movable upstream and downstream at least approximately parallel to the feeding direction between a first downstream position and second upstream position wherein, in the first downstream position, the pusher means are closer to the dispensing position than when in the second upstream position and wherein, in the second upstream position, the pusher means are moved upstream to be farther from the dispensing position than when in the first downstream position, and wherein the feeding mechanism comprises at least one cutting tool for cutting-off the most downstream tag of the chain of tags in the dispensing position and at least one clamping device for clamping the chain of tags against shifting to keep the chain of tags including the most downstream tag stationary when the most downstream tag is arranged in the dispensing position as the most downstream tag is being cut off from the chain of tags by the cutting tool, the cutting tool and the pusher means being coupled together so that the cutting tool is reversibly movable upstream and downstream with the pusher means.

2. The tag feeder according to claim 1, where the pusher means comprise at least one tine, being positioned at a front end of the pusher means facing in the feeding direction.

3. The tag feeder according to claim 2, where the cutting tool comprises a cutting edge being positioned next to at least one tine.

4. The tag feeder according to claim 1, where the clamping device comprises a roll being pivotable around a rotary axis which is arranged at least approximately horizontal and perpendicular to the feeding direction, as well as reversible linearly movable up and down along a clamping direction between a first position in which the roll is detaining the motion of the chain of tags, and a second position in which the roll is releasing the chain of tags.

5. The tag feeder according to claim 1, where the clamping device is accommodated in a casing and connected to the pusher means for reversible movement therewith.

6. The tag feeder according to claim 1, where an imprinting device is provided for imprinting the tags comprising at least one imprinting press and at least one imprinting block.

7. The tag feeder according to at claim 1, where a housing is provided which comprises a channel including a channel bottom and an opening being located at the uppermost side of the housing and extending at least approximately along the complete length of the housing parallel to the feeding direction.

8. The tag feeder according to claim 7, where the channel comprises a first and second section, whereby the first section comprises at least one longitudinal cut-out extending at least approximately parallel to the feeding direction thereby leaving a longitudinal elevation positioned on the channel bottom extending approximately along the center axis of the first section of the channel and approximately parallel to the feeding direction.

9. The tag feeder according to claim 8, where at least one tine of the pusher means is running in at least one cut-out and the foremost tag of the chain of tags is positioned on the elevation to be lifted off the channel bottom, so that the tine of the pusher means is enabled to move at least partially underneath the foremost tag of the chain of tags.

10. The tag feeder according to claim 7, where the housing comprises a cover having a first section with a first longitudinally extending opening hole which is positioned on top of the first section of the channel for accommodating and supporting the guiding of the pusher means as well as a second section with a second longitudinally extending opening hole which is positioned on top the second section of the channel for accommodating and guiding the clamping device.

11. The tag feeder according to claim 10, where the first section of the channel comprises guiding means for guiding at least the foremost tag of the chain of tags along the first section of the channel and that the guiding means are formed by the first section of the channel and the first section of the cover.

12. The tag feeder according to claim 1, where the chain of tags comprises a plurality of tags directly linked to one another by a material connection.

13. The tag feeder according to claim 1 wherein the at least one clamping device is arranged and configured to apply a clamping force to the chain of tags in a direction transverse to the feeding direction.

14. The tag feeder according to claim 1 wherein the at least one cutting tool and the at least one clamping device are both connected to the pusher means to be reversibly movable therewith.

15. A method for feeding tags being provided in a chain of tags, in a feeding direction downstream to a dispensing position within a clipping machine by means of a feeding mechanism with at least one pusher means for transporting the chain of tags, the pusher means being coupled to a cutting tool with the pusher means and the cutting tool coupled thereto being reversibly movable upstream and downstream at least approximately parallel to the feeding direction between a first downstream position and second upstream position, wherein, in the first downstream position, the pusher means is closer to the dispensing position than when in the second upstream position, and wherein, in the second position, the pusher means is moved upstream to be farther upstream from the dispensing position than when in the first downstream position, the method comprising the step of: moving the pusher means into a separating position, wherein a clamping device is clamping the chain of tags against shifting to keep the chain of tags including the most downstream tag stationary when the most downstream tag is arranged in the dispensing position and as the cutting tool is cutting-off the most downstream tag of the chain of tags in the dispensing position.

16. The method according to claim 15, further comprising the step of moving at least one tine of the pusher means underneath the most downstream tag, in order to push the chain of tags in the feeding direction towards the dispensing position.

17. The method according to claim 15, further comprising the step of imprinting at least one tag of the chain of tags when the pusher means is moving from the first downstream position toward the second upstream position.

18. The method according to claim 15, where the chain of tags comprises a plurality of tags directly linked to one another by a material connection.

* * * * *